United States Patent [19]

Fitton et al.

[11] Patent Number: 4,521,553

[45] Date of Patent: Jun. 4, 1985

[54] ANTI-STATIC HIGHLY-PLASTICIZED POLYVINYLCHLORIDE

[75] Inventors: Paul Fitton, Bristol; Peter J. Holland, Frodsham, both of England

[73] Assignee: Dycem Limited, Bristol, England

[21] Appl. No.: 599,976

[22] Filed: Apr. 13, 1984

[51] Int. Cl.³ .............................................. C08K 3/04
[52] U.S. Cl. ..................................... 523/333; 524/496
[58] Field of Search ......................... 523/333; 524/496

[56] References Cited

U.S. PATENT DOCUMENTS

| | | | |
|---|---|---|---|
| 2,244,020 | 6/1939 | Patton | 523/333 |
| 3,085,988 | 4/1963 | Hull et al. | 523/333 |
| 3,406,125 | 10/1968 | Allegrini et al. | |
| 3,635,928 | 1/1972 | Thomas | 523/333 |
| 4,379,871 | 4/1983 | Werle et al. | 523/333 |

FOREIGN PATENT DOCUMENTS

| | | | |
|---|---|---|---|
| 1217916 | 6/1966 | Fed. Rep. of Germany | 524/496 |
| 52-42295 | 4/1977 | Japan | 524/496 |
| 57-90021 | 6/1982 | Japan | 524/496 |
| 1179084 | 1/1970 | United Kingdom | 524/496 |
| 1399191 | 6/1975 | United Kingdom . | |
| 1475366 | 6/1977 | United Kingdom . | |
| 2025319 | 6/1980 | United Kingdom . | |

*Primary Examiner*—Paul R. Michl
*Assistant Examiner*—N. Sarofim
*Attorney, Agent, or Firm*—Christensen, O'Connor, Johnson & Kindness

[57] ABSTRACT

A composition comprising 99.5 to 75% by weight of highly plasticized polyvinylchloride (PVC) which consists of 15 to 45% by weight of polyvinylchloride (as herein defined) and 55 to 85% by weight of a plasticizer, and from 0.5 to 25% by weight of carbon fibers.

5 Claims, 2 Drawing Figures

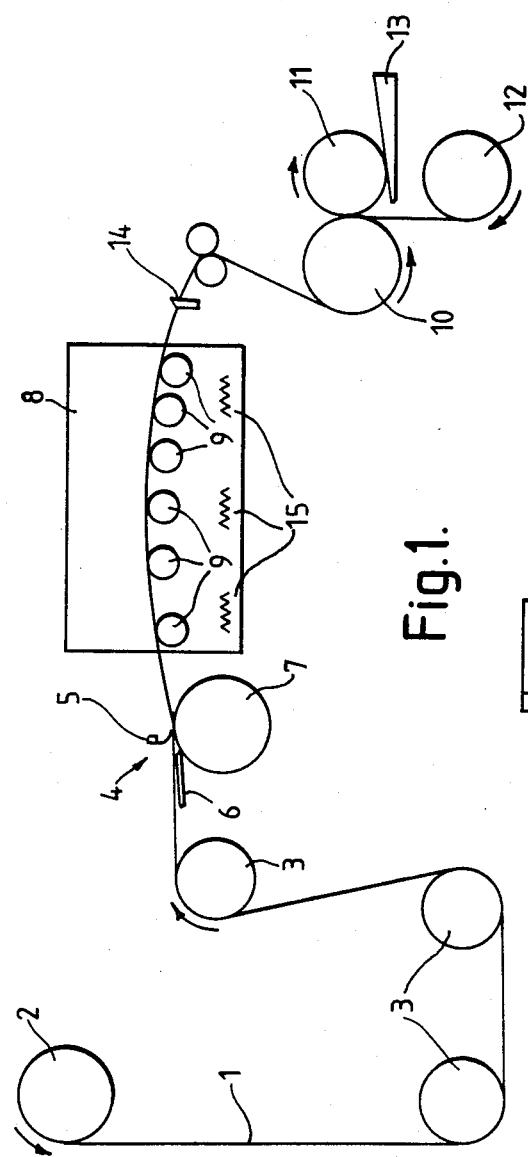
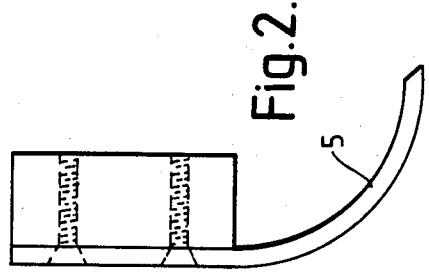

ANTI-STATIC HIGHLY-PLASTICIZED POLYVINYLCHLORIDE

This invention relates to a composition comprising highly plasticised polyvinylchloride (PVC) containing an electrically conductive material, which composition has useful anti-static, particle-collecting, and non-slip properties. It also relates to a method of preparing this composition, to a composite sheet material comprising a layer of this composition and an electrically-conductive backing, and to a method manufacturing this composite sheet material.

The terms "polyvinylchloride" and "PVC" as used herein include copolymers prepared from a major amount of vinyl chloride and a minor amount of one or more suitable comonomers. An example of a suitable comonomer is vinyl acetate.

Highly plasticised PVC is the subject of our British Pat. No. 1399191. Floor covering comprising highly plasticised PVC for the retention of particles such as dust and bacteria are the subject of our British Pat. Nos. 1475366 and 2025319.

The usefulness of highly plasticised PVC depends to a large extent on the fact that its surface is always coated with a very thin layer of plasticiser, which contributes to the non-slip properties, and is also responsible for the particle-retaining properties. Although this layer of plasticiser is removed, along with the particles collected, during cleaning, it is quickly replaced by the migration of more plasticiser from the interior of the material to the surface. Floor coverings containing highly-plasticised PVC are now widely used in a variety of applications where it is essential to minimise contamination by particles such as dust and bacteria. One such application is in the microelectronics industry, where it is essential to exclude dust from delicate electronics equipment and components. In this field, static electricity can also cause severe problems and it is therefore an object of this invention to provide a highly plasticised PVC composition and a floor covering material containing it, which retain the aforesaid non-slip and dust and bacteria collecting properties, whilst also being electrically conductive to prevent the accumulation of static electricity.

The inclusion of conductive material in PVC compositions to provide antistatic or conductive flooring materials which contain normal levels of plasticiser, and are therefore not highly plasticised, is already known.

So called "antistatic" PVC flooring, which has a resistivity above $1 \times 10^8 \Omega$, derives its anti-static properties from the inclusion of special plasticisers and also quaternary ammonium salts. So called "conductive" PVC flooring has a resistivity below $5 \times 10^4 \Omega$ (when earthed) and is useful in areas where an accumulation of static electricity could be particularly hazardous, e.g. entail the risk of fire or explosion. Hitherto, such conductive flooring has been manufactured by incorporating 25% (by weight) or more of carbon black into the PVC. Between these two types of flooring in anti-static performance lies a third class, the so-called "antistatic/conductive" flooring. which has a resistivity between $5 \times 10^4 \Omega$ and $1 \times 10^8 \Omega$ (when earthed), and derives its electrical properties from an increased proportion of quaternary ammonium salts, and possibly a relatively small amount of carbon black.

It has been found to be impossible to make a PVC composition which contains both sufficient carbon black to render it conductive, and sufficient plasticiser to provide anti-slip and particle-retaining properties.

U.S. Pat. No. 3,406,126 describes a method of incorporating carbon fibres into plastics materials to render them conductive. It involves mixing the plastics material ingredients with the carbon fibres under conditions of little or no shear stress, in order to avoid undesired breakage of the carbon fibres.

According to one aspect of the present invention we provide a composition comprising 99.5 to 75% by weight of highly plasticised PVC, which consists of 15 to 45% by weight of polyvinylchloride (as herein defined) and 55 to 85% by weight of a plasticiser, and from 0.5 to 25% by weight of carbon fibres.

The composition may also contain known additives for PVC compositions, such as stabilisers and viscosity modifiers, in conventional proportions, as well as small quantities of pigments.

The carbon fibres are preferably not more than 6 mm in length, 3 mm being the most preferred length.

Compositions according to this invention are capable of achieving the required conductivities for both "conductive" and "antistatic/conductive" flooring as mentioned above.

The method described in U.S. Pat. No. 3,406,126 cannot be used to prepare compositions according to the present invention, because it is impossible to mix the PVC resin (which is commercially available and is essentially pure polyvinylchloride) with a substantial quantity of plasticiser using low shear conditions, in that a homogeneous mixture cannot thus be obtained. The resulting mix is lumpy and contains agglomerates of undispersed resin.

We also provide a process for preparing a composition as defined above, comprising mixing polyvinylchloride resin with an initial quantity of plasticiser under high shear conditions to obtain an initial homogeneous mixture, and blending this initial mixture with a slurry comprising carbon fibres and further plasticiser under low shear conditions to obtain a final homogeneous mixture, and curing said final homogeneous mixture.

The plasticiser may be added in several stages prior to the addition of the carbon fibre/plasticiser slurry.

This composition may be applied as a coating to a substrate, possibly with the interposition of an intermediate layer to provide a barrier against plasticiser migration, if desired. This coating process is preferably carried out continuously, using a spreader to spread the material (the final homogeneous mixture mentioned above) evenly over a continuous backing web.

The spreader is preferably in the form of a blade having a part-cylindrical surface curving away in the direction of travel of the web so that the downstream edge which is in contact with the coating is substantially parallel to the web. Alternatively, a fixed cylindrical roller may be used.

According to another aspect of this invention we provide a composite sheet material comprising a layer of the above-defined composition and an electrically-conductive backing.

The composite sheet material preferably also includes an electrically-conductive intermediate layer of polymeric material to resist any migration of plasticiser from the highly-plasticised PVC layer to or through the backing.

The backing and/or the intermediate layer may also contain carbon fibres or alternatively metal fibres, particles, or flakes to render them conductive. Alternatively the backing may be formed from an inherently-conductive material. Thus the backing may for example comprise a woven or non-woven fibrous material of inherently-conductive fibres or be modified by inclusion of conductive fibres or filaments, or a foil of a material which is inherently electrically conductive such as aluminium, or which has been modified to render it electrically conductive, such as a conductive rubber sheet.

One particularly preferred backing is a woven glass-fibre material.

There is also provided a method of preparing a composite sheet material as described above, wherein an uncured composition comprising 99.5 to 75% by weight of highly plasticised PVC, which consists of 15 to 45% by weight of polyvinylchloride (as herein defined) and 55 to 85% by weight of a plasticiser, and from 0.5 to 25% by weight of carbon fibres, is coated onto a substrate, which may already be provided with an intermediate plasticiser-impervious layer, said composition is smoothed out by a spreader having an elongated cylindrical surface extending transverse to the direction of travel of the substrate and arranged so that the downstream edge which is in contact with said composition is substantially parallel to the substrate, and curing the resulting coating.

In an alternative method the carbon fibre-containing highly-plasticised PVC is first coated onto a release belt or paper, an intermediate plasticiser-impervious layer is applied to the highly-plasticised PVC layer, and the fibrous backing fixed to the intermediate layer, for example by heat bonding or by means of an adhesive. The release belt or paper can then be removed.

The composition and electrical conductivities of two composite sheet materials (designated Examples 1 and 2) embodying the present invention are shown in the table, by way of illustration only.

One process of preparing the composition of the invention, and of coating this composition onto a backing sheet, will now be described by way of example.

The composition prepared by the following process is that of Example 1 or Example 2 given in the table.

Firstly, commercially available PVC resin (i.e. substantially pure polyvinylchloride obtained by vacuum drying of the product of aqueous emulsion polymerisation of liquid vinyl chloride monomer) is mixed with the stabiliser and about one third of the total quantity of plasticiser required for the highly plasticised PVC composition, using a high-shear mixer (e.g. a Baker-Perkins 2-blade mixer). After about 10 minutes continuous kneading an initial homogeneous mixture was obtained in the form of a thick dough. The remainder of the plasticiser, except for the last 10% of the total, is added in stages whilst mixing is continued. The viscosity of the mixture gradually decreases over this period as the plasticiser content increases. The final 10% of the plasticiser is added as a slurry with the carbon fibres and mixing is further continued in the same mixer. By this time, the viscosity of the mixture has decreased to such an extent that this further mixing takes place under low shear conditions, thus without substantial breakage of the carbon fibres.

This part of the process, starting with the commencement of addition of the remaining plasticiser, lasts for about 30 minutes. The carbon fibre slurry is made up in advance in a low-shear mixer, such as a slow-speed paddle stirrer. The weight ratio carbon fibres:plasticiser is generally about 1:6, in order to yield a pourable slurry.

It is essential to add the carbon fibres as a slurry as otherwise they will not mix properly, by virtue of their lightness and the large amount of entrained air that they contain.

The resulting final mixture can then simply be heat-cured in known manner in a mould, or can be used to coat a substrate as will now be described with reference to the accompanying drawings:

FIG. 1 is a schematic drawing illustrating the process, and

FIG. 2 is a detail side elevational view of the spreader blade used.

A continuous web 1 of, for example, a woven glass fibre fabric (see Example 2), which is to form the backing and to which an intermediate plasticiser-impervious layer has already been applied, is continuously unwound from a supply roller 2. This passes around a series of idler rollers 3 until it reaches a coating station 4 where the uncured mixture of highly plasticised PVC and carbon fibres, prepared as described above, is applied to it. It is important that this mixture be subjected to agitation immediately prior to application to the web, as the carbon fibres have a tendency to separate out over a period of time if the mixture is left undisturbed. This mixture is smoothed out to the desired thickness by a spreader blade 5 acting against a supporting plate 6 or the roller 7.

The spreader blade is in the form of an elongated cylindrical section of 100 mm radius arranged transverse to the direction of travel of the web, so that the blade curves away in the direction of travel, its downstream edge portion being substantially parallel to the plane of the web. This special design of blade is to prevent the accumulation of carbon fibres on the blade, which tends to occur with conventional blades.

The cotton fabric with the layer of polymeric material is then passed through an oven 8. During its passage through the oven the web is supported by a series of support rollers 9 which are so arranged that the web follows a slightly convex path. This is to prevent creasing of the polymeric material as curing progresses. The oven is heated by gas burners 15 located beneath the web. This is important as the turbulence caused by any burners above the web would tend to disturb the layer of highly-fluid hot polymeric material. The polymeric material is cured in the oven and sets. After emerging from the oven, the edges of the strip are trimmed, or the strip is cut to width, by blades 14. The web then passes around a driven water-fed cooling roller 10, and is finally taken up on roller 11. A web of release material, to prevent adjacent turns of the coated web from sticking together, is interleaved with the coated web from a supply roller 12. The take-up roller 11 is frictionally driven by the cooling roller 10, and rests against it on an inclined plane 13. It gradually rises up the inclined plane as it fills up and its diameter increases. When it is full it is replaced by an empty take-up roller. The only driven roller in the apparatus is the cooling roller 10, all the other rollers are idlers.

The intermediate plasticiser-impervious layer is applied to the web in advance, possibly using the same apparatus.

The finished composite material can be bonded, using an adhesive, to the floor, ceiling and walls of an enclosure such as an operating theatre or computer room, or pharmaceutical or precision engineering plant, and then earthed. The tacky surface of the highly-plasticised PVC layer retains any dirt or bacteria which comes into contact with it. The surface is washed down periodically using a mixture of water and a conventional detergent to remove the surface layer of plasticiser together with the dirt and bacteria adhering to it, and dried. The surface layer of plasticiser is quickly replaced by further plasticiser migrating from within the body of the highly plasticised PVC layer.

The material is particularly useful in areas where airborne dust constitutes a fire or explosion hazard, because the material tends both to retain the dust, whilst minimising the risk of sparking by virtue of its electrically-conductive properties.

by weight of carbon fibres, said process comprising mixing PVC resin with an initial quantity of plasticiser under high shear conditions to obtain an initial homogeneous mixture, and blending this initial mixture with a slurry comprising carbon fibres and further plasticiser under low shear conditions to obtain a final homogeneous mixture, and curing said final homogeneous mixture.

2. A process according to claim 1, wherein the plasticiser is added in several stages prior to the addition of the carbon fibre/plasticiser slurry.

3. A process according to claim 1, wherein the carbon fibres are not more than approximately 6 mm in length.

4. A process according to claim 3, wherein the carbon

TABLE

EXAMPLES:

| | Example 1 | Example 2 |
|---|---|---|
| Highly-plasticised PVC (2 mm. thick) | 63% Plasticiser (Chain-stopped polypropylene glycol adipate)<br>33% PVC resin<br>1% Carbon fibres ("Grafil XA/S")<br>3% { stabiliser: "Lankro Mark LA 105" - a Ca/Zn fatty acid salt.<br>viscosity modifier: Finely-divided $SiO_2$ "Gasil". | 63% Plasticiser (Chain-stopped polypropylene glycol adipate)<br>33% PVC resin<br>1% Carbon fibres ("Grafil XA/S")<br>3% { stabiliser: "Lankro Mark LA 105" - a Ca/Zn fatty acid salt.<br>viscosity modifier: Finely divided $SiO_2$ "Gasil". |
| Plasticiser-impervious layer (1 mm. thick) | 75% Polyurethane<br>25% Al powder | 37% Plasticiser (as above)<br>62% PVC resin<br>1% carbon fibres ("Grafil XA/S") |
| Backing layer | metal foil (steel, brass or aluminum) | Glass-fibre woven fabric having alumised threads at one cm spacing in the warp and weft (Fothergill Engineered Fabrics - grade YO 413 plus Al fibres). |
| Resistivity | $0.96 \times 10^6$ Ohms | $0.52 \times 10^6$ ohms |

In both cases, a very small quantity of pigment may be incorporated into the highly-plasticised PVC layer.

We claim:

1. A process for preparing a composition which comprises 99.5 to 75% by weight of highly plasticised polyvinylchloride (PVC) which consists of 15 to 45% by weight of polyvinylchloride (as herein defined) and 55 to 85% by weight of a plasticiser, and from 0.5 to 25% fibres are approximately 3 mm in length.

5. A process according to claim 1, further comprising adding one or more additives selected from stabilisers, viscosity modifiers, and pigments.

* * * * *